July 22, 1941.     M. M. STARBIRD     2,250,280
ELECTRICAL BOND
Filed May 14, 1940     2 Sheets-Sheet 1
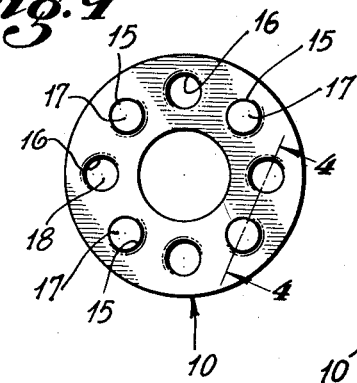
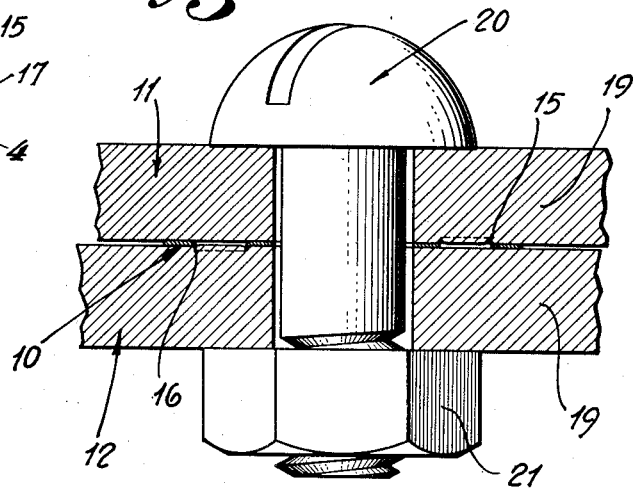
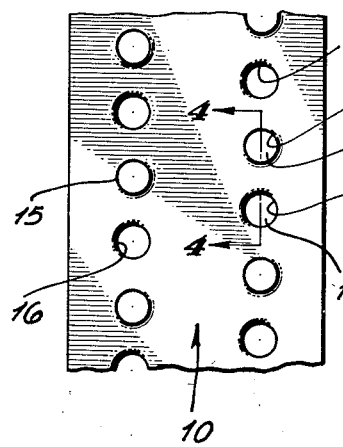
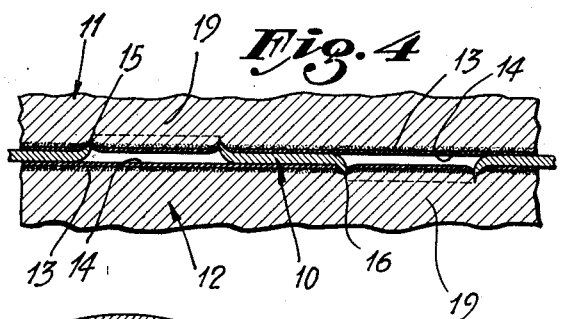
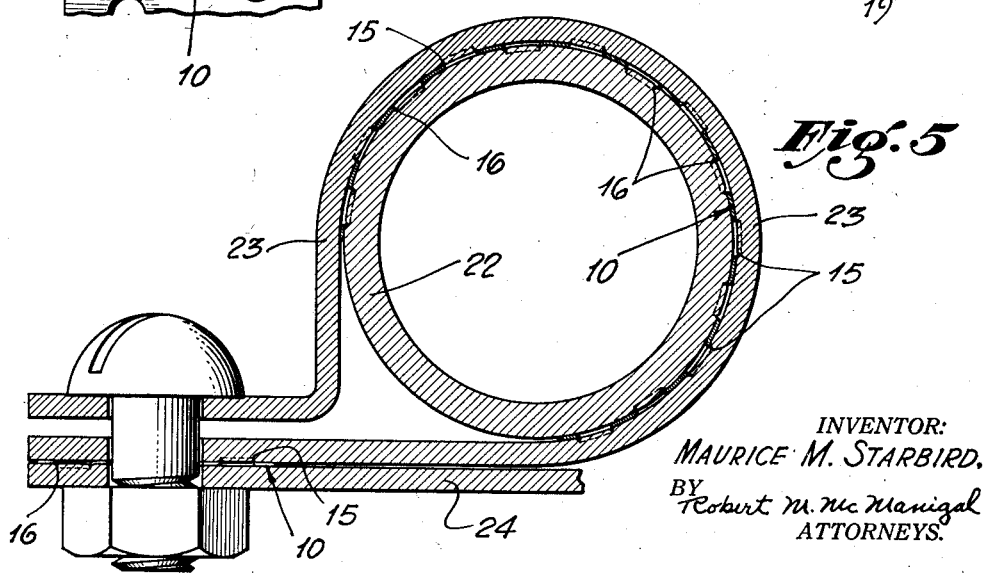
INVENTOR:
MAURICE M. STARBIRD.
BY Robert M. McManigal
ATTORNEYS.

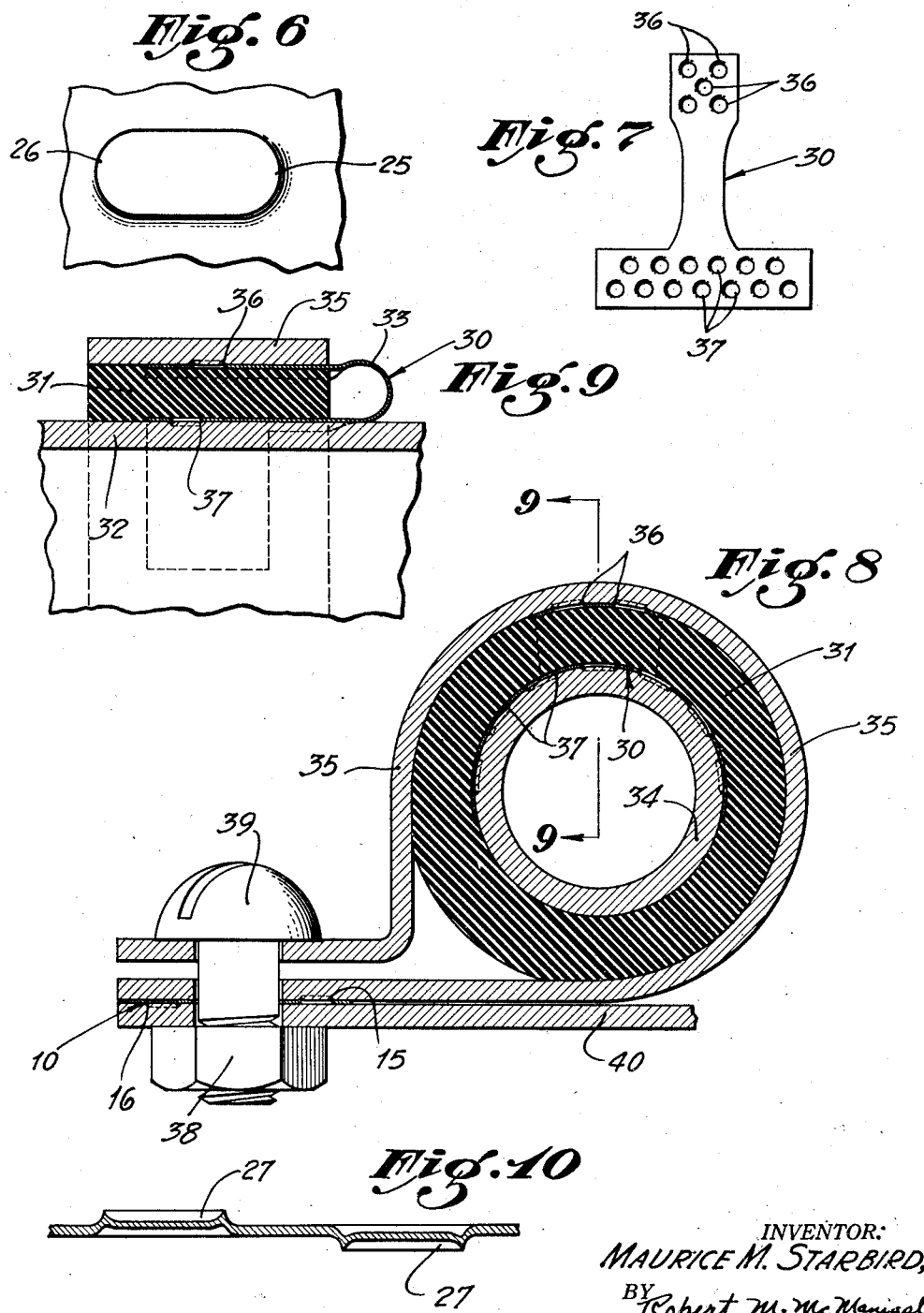

Patented July 22, 1941

2,250,280

UNITED STATES PATENT OFFICE 2,250,280

ELECTRICAL BOND

Maurice M. Starbird, Burbank, Calif.

Application May 14, 1940, Serial No. 335,080

7 Claims. (Cl. 173—324)

This invention relates to electrical bonds and particularly to electrical bonds for use in aircraft construction.

The processes used to prevent corrosion of the various parts of aircraft generally produce a surface having a relatively high electrical resistance compared to the parent metal. These protective coatings isolate the various parts of the aircraft in a manner whereby variations in electrical potentials may exist in the aircraft. Such a condition causes static disturbances that are dangerous and troublesome and especially may seriously interfere with radio reception. Therefore, in actual practice, all metal parts of the aircraft are bonded together.

Electrical bonds of low resistance material have been used which are provided with a plurality of teeth or sharp prongs which not only pierce the protective coating but also the parent metal in such a way that the prongs frequently cause a continuous fracture in one or both of the pieces of metal which are bonded, thereby necessitating the removal of the fractured piece or its failure in service.

All metals are crystalline in structure. In the geometrical arrangement of the crystalline structure will be found certain planes of weakness, particularly in metals heat treated to secure their maximum resistance to shear per unit of weight as in aircraft construction. This results in the precautions necessary to protect the surface from scratches and scars which may start a fracture, resulting in dangerous structural failures. As in the cutting of glass, only a scratch is needed to start a clean break, in such a material subject to sharp impact or constant vibration. Heat treated alloys such as those of aluminum and iron of the higher tensile strengths have this same brittle quality.

The object of my invention is to provide a thin, flat strip of a non-corrosive metal, having one or more protrusions on each of one or more of its largest sides, said protrusions being adapted to pierce in a shallow manner the protective coatings and contact the parent metals, thereby insuring electrical bonding without damaging the metals bonded together.

Another object of my invention is to provide an electrical bond with at least one protrusion on each of one or more of its largest sides which may be quickly inserted between the metals to be bonded together at the place of support and in which the pressure of the securing device is ample to cause satisfactory contact of the protrusions with the parent metals bonded together.

Another object of my invention is to provide an electrical bond with one or more protrusions which are designed to puncture the protective coatings and to contact the metals bonded in such a manner that the contact of the protrusions and parent metal is preferably continuous upon itself and encloses a definite area of protective coating. This prevents a fracture, should one develop, from becoming so extensive as to necessitate the removal of the piece of metal, or its failure in service.

Another object of my invention is to provide an electrical bond with one or more protrusions, the outer ends of which are preferably circular, but which may be elliptical, undulated or of any other form in which the perimeter has no abrupt changes in direction.

Another object of my invention is to provide an electrical bond with one or more protrusions, the outer ends of which are preferably hollow or provided with recesses, so that the protrusions are readily adapted to puncture the protective coating and the treated metal and contact the untreated or parent metal.

Another object of my invention is to provide protrusions of a definite height so that the metals bonded will be pierced only deep enough to insure a satisfactory electrical contact yet not deep enough to injure the parent metals. This depth or height can readily be controlled in the manufacture of the bonding device.

Another object of my invention is to have the diameter of the protrusions as large as practical to conform to the specific installation and as near together as possible to decrease the resistance within the bond between opposing projecting protrusions.

Another object of my invention is that the periphery shall be as smooth and sharp as possible and of even height, free from both roughened and pointed edges which might damage the material bonded.

Another object of my invention is to keep the bonding insert stationary in relation to the metals bonded so that a scratch or scar will not result in the moving of said bond which will result in the removal of excess protective coating or the danger of starting a failure in the parent metal. It is undesirable to use said bond as a lock washer or to rotate it about a central point.

Another object of my invention is that the protrusions may be protruded from one of the bonded metals provided it is harder than the other metal bonded and this feature lends itself to the advantage of better construction.

My invention has many other objects, advantages, and features, some of which, with the foregoing, will be set forth in the following description where I shall outline certain forms of my invention which I have selected for illustration in the drawings accompanying and forming a part of the present specification.

Referring to the drawings:

Figure 1 is a plan view of an electrical bond of circular form having a plurality of protrusions on either side embodying the feature of my invention.

Figure 2 is a sectional view showing the application of the electrical bond shown in Fig. 1.

Figure 3 is a plan view of a strip of metal with a plurality of protrusions on either side embodying the features of my invention, used to bond a tube to a supporting clip.

Figure 4 is a greatly enlarged, fragmentary sectional view taken on the lines 4—4 in Figs. 1 and 3.

Figure 5 is a sectional view showing an application of the form of my invention shown in Fig. 3.

Figure 6 is a plan view of another modification embodying the features of my invention.

Figure 7 is a flat plan view of another form of my invention with protrusions on one side only.

Figure 8 is a sectional view of the bonding piece shown in Fig. 7 formed around a tubular member.

Figure 9 is a section taken on the lines 9—9 in Fig. 8.

Figure 10 is still another form of my invention having a sharp periphery but not hollowed out.

In the drawings, the numeral 10 indicates an electrical bond which is adapted to be used to electrically bond two metallic members 11 and 12 in an aircraft. The bond 10 is made of a metal which is harder than the members 11 and 12 which are usually made of an aluminum alloy, and treated by the anodic process which affects the outer surface of the metal as indicated at 13 (an insulating coating) and provided with a protective insulating coating, such as zinc chromate paint as indicated at 14 in Figure 4.

The bond 10 is provided with protrusions 15 and 16. The protrusions 15 and 16 are preferably hollowed out as indicated at 17 and 18 respectively so that they are readily adapted to puncture the applied protective coating 14 and the treated metal 13 and contact the untreated or parent metal 19, when the metallic members 11 and 12 are secured together by any usual means, such as a screw 20 and nut 21.

In Figure 5 I show a form of my invention which is shown in plan view in Fig. 3 adapted for use to electrically bond tubing 22 to a supporting clamp 23 which in turn is electrically bonded to a supporting member 24 by means of a bond 10 such as is shown in Fig. 1.

Although I prefer to have the outer portions of the protrusions of circular form, they may be of any suitable form. For example, the outer ends of the protrusions may be elliptical, undulated, or of any other form in which the perimeter has no abrupt changes in direction. For example, as indicated in the modifications shown in Figure 6, the ends of the protrusions 25 and 26 may be rectangular in shape with the ends rounded or undulated, or said protrusions may be recessed as indicated at 27 in Figure 10.

Figures 7, 8, and 9 show an application of my invention in the form of an electrical bond 30 around a resilient support 31 by use of a flat piece of metal shown in plan view in Fig. 7 inserted around a tube or similar object 32 shown in cross section in Fig. 8. The electrical bond 30 is adapted to be formed back over itself in the form of a loop 33 as shown in Fig. 9 to make a bond to supporting clamp 35 through the protrusions indicated at 36 and 37. This application makes a flexible mounting possible to protect tubing 32 from excessive vibration as found around aircraft engines and yet form a continuous bond between all parts of the structure.

In order to insure a good contact between the protrusions 36 and 37 of the grounding strip 30 with the parent metal of the tubing 32 and the supporting clamp 35 respectively, as the nut 38 is tightened on the bolt 39, the protrusions 36 and 37 are preferably hollowed out. Instead of being hollowed out, the ends of said protrusions may be recessed as indicated at 27 in Fig. 10. However, I prefer to provide hollow protrusions in order to insure that the pressure of the securing device is ample to provide a good contact between the metal of the protrusions and the parent metals bonded together.

The bonding strip 30 is preferably made of the same metal as the bond 10. The tubing 32, supporting clamp 35 and supporting member 40 are usually made of aluminum alloy which is treated by the anodic process and provided with a protective coating such as zinc chromate.

From the foregoing description, taken in connection with the accompanying drawings, the uses and advantages of my invention will be readily understood by those skilled in the art to which the invention appertains. While I have described the forms of my invention which I now consider to be the best embodiment thereof, I desire to have it understood that the articles shown and described are merely illustrative and that the invention is not to be limited to the details disclosed herein, but is to be accorded the full scope of the appended claims.

I claim:

1. A device for interposition between two pieces of metal at a joint thereof for electrically bonding said metals which comprises a very thin flat member that will permit a close tight joint between said metals, said member having shallow ridged protrusions extending therefrom, said protrusions being adapted to penetrate said joined pieces, each of said protrusions being in the form of a ridge which is continuous upon itself, and encloses an area of the metal of one of said pieces, the perimeter of the ridge of each protrusion being of substantially even and predetermined height.

2. A device for interposition between two pieces of metal at a joint thereof for electrically bonding said metals which comprises a very thin flat member that will permit a close tight joint between said metals, said member having shallow ridged protrusions extending therefrom, said protrusions being adapted to penetrate said joined pieces, each of said protrusions being in the form of a ridge which is continuous upon itself and encloses an area the diameter of which is at least as large as the height of said ridges, the perimeter of the ridge of each protrusion being of an even and predetermined height.

3. A device for interposition between two pieces of metal at a joint thereof for electrically bonding said metals which comprises a very thin flat member that will permit a close tight joint between said metals, said member having shallow ridged protrusions extending from each side thereof, said protrusions being adapted to penetrate said joined pieces and being formed of metal which is harder than that of said pieces, each of said protrusions being in the form of a ridge which is continuous upon itself and encloses an area of the metal of one of said pieces, the perimeter of the ridge of each protrusion being of an even and predetermined height and having no abrupt changes in its structure.

4. A device for interposition between two pieces of metal at a joint thereof for electrically bonding said metals which comprises a very thin flat member that will permit a close tight joint between said metals, said member being formed of non-corrosive metal which is harder than that of said pieces and having shallow ridged protrusions extending therefrom which are adapted to penetrate said joined pieces, each of said protrusions being in the form of a ridge which is continuous upon itself and encloses an area of the metal of one of said pieces, the perimeter of the ridge of each protrusion being of an even and predetermined height and having no abrupt changes in its structure.

5. A device for interposition between two pieces of metal at a joint thereof for electrically bonding said metals which comprises a very thin flat member that will permit a close tight joint between said metals, said member being formed of non-corrosive metal which is harder than that of said pieces and having a plurality of shallow ridged protrusions extending from both sides thereof which are adapted to penetrate said joined pieces, each of said protrusions being in the form of a ridge which is continuous upon itself and encloses an area of the metal of one of said pieces, the perimeter of the ridge of each protrusion being of an even and predetermined height and having no abrupt changes in the structure, the protrusions extending from each side thereof being positioned relatively close together to thereby reduce electrical resistance.

6. The combination of two pieces of metal and means for securing them together, with a thin flat member for electrically bonding said pieces, said member having protrusions extending from its sides in the form of ridges continuous upon themselves, said member being interposed between said pieces so that its sides lie flat against the faying sides of said pieces with said protrusions embedded in the metal of said pieces, each of said protrusions completely surrounding a portion of the metal of said pieces.

7. The combination of two pieces of metal, non-conductive material separating said pieces and means for securing them together, with a thin flat member for electrically bonding said metal pieces, said member having protrusions extending from one of its sides and adjacent its ends in the form of ridges continuous upon themselves, said member being flexed around an edge of said non-conductive material with its ends interposed between said material and said metals so as to lie flat against the faying sides of said pieces with said protrusions embedded in the metal of said pieces, each of said protrusions completely surrounding a portion of the metal of said pieces.

MAURICE M. STARBIRD.